US011513393B2

(12) United States Patent
Oh et al.

(10) Patent No.: US 11,513,393 B2
(45) Date of Patent: Nov. 29, 2022

(54) DISPLAY BACKLIGHT ILLUMINATION OF A HOUSING PERIMETER

(71) Applicant: Dell Products L.P., Round Rock, TX (US)

(72) Inventors: Guentaek Oh, Singapore (SG); Seen Yee Cindy Cheong, Singapore (SG); Lee Kyung Eun, Singapore (SG)

(73) Assignee: Dell Products L.P., Round Rock, TX (US)

( * ) Notice: Subject to any disclaimer, the term of this patent is extended or adjusted under 35 U.S.C. 154(b) by 356 days.

(21) Appl. No.: 16/436,163

(22) Filed: Jun. 10, 2019

(65) Prior Publication Data

US 2020/0387035 A1    Dec. 10, 2020

(51) Int. Cl.
| | |
|---|---|
| *G02F 1/13357* | (2006.01) |
| *G02F 1/1333* | (2006.01) |
| *G02F 1/1335* | (2006.01) |
| *G02F 1/01* | (2006.01) |

(52) U.S. Cl.
CPC .. *G02F 1/133621* (2013.01); *G02F 1/133308* (2013.01); *G02F 1/133553* (2013.01); *G02F 1/0126* (2013.01); *G02F 1/0147* (2013.01); *G02F 1/133317* (2021.01)

(58) Field of Classification Search
CPC ........ G02F 1/133621; G02F 1/133308; G02F 1/133553
See application file for complete search history.

(56) References Cited

U.S. PATENT DOCUMENTS

| | | | |
|---|---|---|---|
| 8,823,541 B2 | 9/2014 | Hardacker | |
| 8,934,059 B2 | 1/2015 | Lowe et al. | |
| 2008/0251954 A1* | 10/2008 | Casper | B01F 23/2311 210/150 |
| 2010/0002018 A1* | 1/2010 | Hirata | G09G 5/028 345/690 |
| 2011/0063214 A1* | 3/2011 | Knapp | H04L 12/43 345/158 |
| 2011/0249453 A1* | 10/2011 | Okitsu | G02F 1/133308 362/362 |
| 2014/0031758 A1* | 1/2014 | Lee | A61M 5/3286 604/189 |
| 2015/0118481 A1* | 4/2015 | Kodama | C08J 9/122 428/317.3 |
| 2016/0255336 A1* | 9/2016 | Wang | H04N 13/344 348/54 |

FOREIGN PATENT DOCUMENTS

KR    20190007807 A    1/2019

OTHER PUBLICATIONS

Google patent machine translation of CN101248338A (Year: 2008).*

* cited by examiner

*Primary Examiner* — Lucy P Chien
(74) *Attorney, Agent, or Firm* — Zagorin Cave LLP; Robert W. Holland

(57) ABSTRACT

An information handling system display manages direction of illumination from an internal backlight to illuminate the display perimeter. A translucent material disposed between a liquid crystal display panel and backlight manages a color of backlight illumination applied at the display perimeter. In various alternative embodiments, the translucent material selectively adjusts light transmission characteristics to adjust light that passes to a frontside of the liquid crystal display panel.

20 Claims, 3 Drawing Sheets

DISPLAY BACKLIGHT ILLUMINATION OF A HOUSING PERIMETER

BACKGROUND OF THE INVENTION

Field of the Invention

The present invention relates in general to the field of information handling system displays, and more particularly to a display backlight illumination of a housing perimeter.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems typically output information as visual images at a display. One typical type of display is a flat panel liquid crystal display (LCD). LCDs present visual images by adapting a crystal state of an array of pixels to filter red, green and blue light from a backlight source. Generally, an LCD is built with a display panel that has an array of pixels controlled by a timing controller, and the display panel is assembled over top of a backlight assembly that provides illumination through the pixels. A typical display panel provides illumination from a white light source, such as a strip of light emitting diodes (LEDs) or a cold cathode fluorescent lamp (CCFL). Generally, the backlight is directed towards the display panel by an arrangement of light guides and reflectors so that illumination is efficiently used to present visual images. In addition, light leakage from the backlight is limited by sealing around the perimeter of the backlight where it meets the display panel to prevent illumination from escaping around the outer bezel of the display housing.

In some instances, displays include external illumination to provide extra effects, such as to enhance gaming applications. Generally, such extra effects are provided with LEDs located on the outside of the display housing. Some examples of such external illumination include a string of LEDs integrated in the display stand, on the backside display surface and around the periphery of an integrated display speaker. In some instances, light is directed outward from the display stand to illuminate the support surface on which the display rests. In one display television sold by Phillips, a string of LEDs is disposed at the backside perimeter of the display housing so that some light passes to the front of the display at the bezel to provide visual effects.

A number of difficulties arise with adding external light effects. One difficulty is that external lighting increases power consumption by drawing power to illuminate the external LEDs. Another difficulty is that adding external lights and a control circuit to manage the external lights increases system cost, both in hardware and in software that manages how illumination takes place. Further, external lights are generally integrated within the display housing in a manner that makes maintenance and repair of failures difficult. If an external light effect fails, the end user has a poor experience with a distraction that impacts viewing of active visual images and that is difficult to repair.

SUMMARY OF THE INVENTION

Therefore, a need has arisen for a system and method which provides display backlight illumination of a display housing perimeter.

In accordance with the present invention, a system and method are provided which substantially reduce the disadvantages and problems associated with previous methods and systems for providing illumination at a display housing exterior. A translucent material disposed between a liquid crystal display panel and backlight provides illumination from the backlight to the front of the display at the perimeter of the liquid crystal display panel.

More specifically, an information handling system processes information with a processor and memory that cooperate to execute instructions and to present the information as visual images at a display. The display presents the visual images by illuminating a liquid crystal display panel with a backlight coupled behind that liquid crystal display panel by a display housing. A translucent material is disposed between the liquid crystal display panel and display housing to manage passage of some illumination by the backlight to the frontside of the display where the display housing region at the perimeter of the liquid crystal display is illuminated. The translucent material, for instance, filters the backlight illumination to provide color at the perimeter of the liquid crystal display panel, such as that blends with content presented by the display. In one embodiment, light passage and/or color filtering are adapted at the translucent material to provide various illumination effects at the display frontside.

The present invention provides a number of important technical advantages. One example of an important technical advantage is that a display housing has illumination applied at the display exterior with internal illumination so that additional lighting or control logic for the external lighting is not needed. Passing the internal lighting through a filter that adapts the illumination color provides additional external lighting effects. Leveraging internal lighting to provide external illumination reduces power consumption by avoiding external housing lighting yet does not detract from visual image quality where the internal illumination is redirected from internal housing positions from which redirection towards the display panel is impractical, such as at the backlight perimeter placement against the display panel. Active filter adjustment of light leaked from the backlight perimeter to have desired color characteristics can provide additional visual effects to enhance the end user experience, such as by melding illumination of a perimeter bezel with display visual image content.

BRIEF DESCRIPTION OF THE DRAWINGS

The present invention may be better understood, and its numerous objects, features and advantages made apparent to FIG. 1 depicts a block diagram of an information handling system and display that presents visual images with illumination effects at the display frontside perimeter.

DETAILED DESCRIPTION

An information handling system display includes a translucent material about its perimeter that provides illumination at the display panel front side perimeter. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
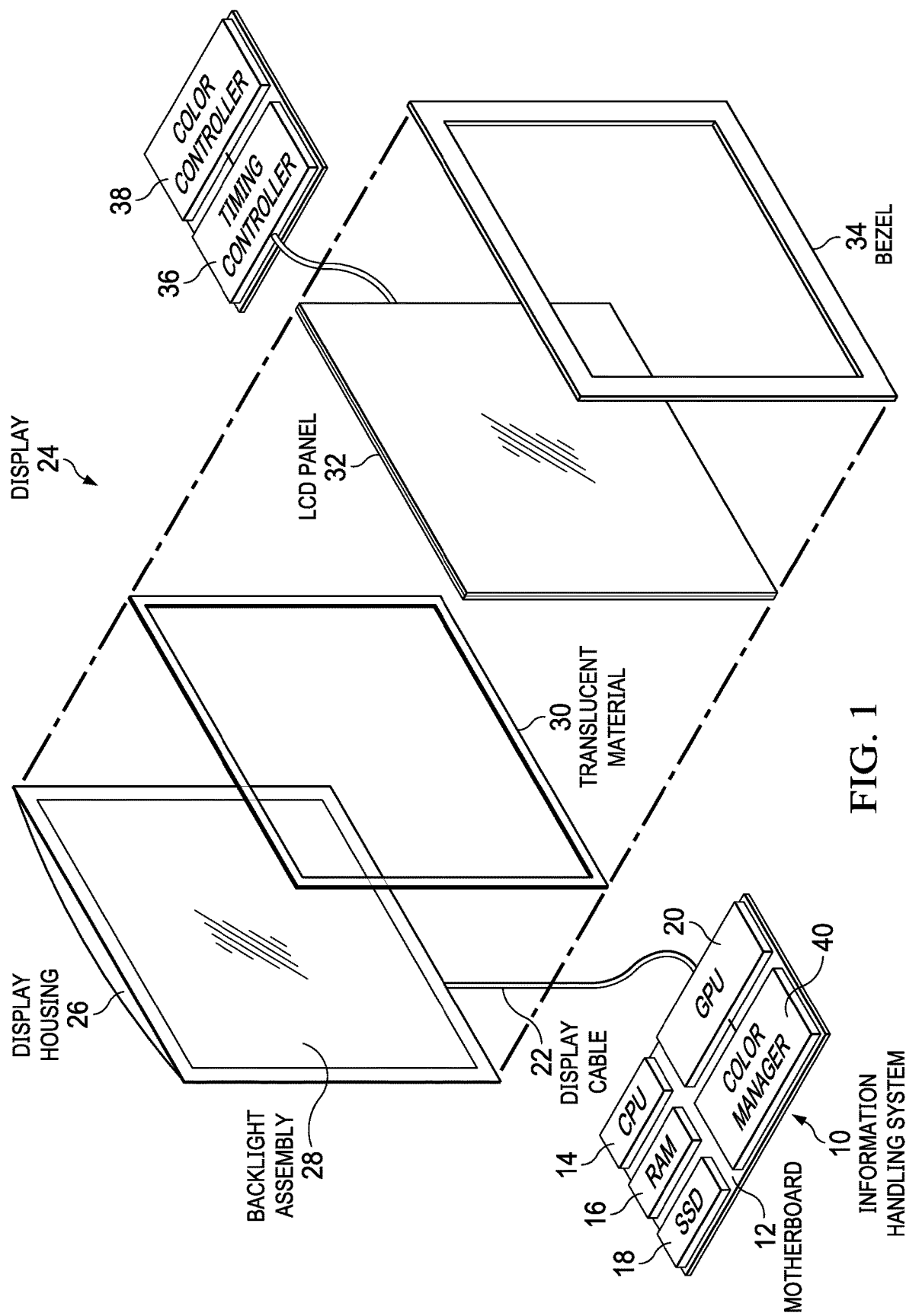

Referring now to FIG. 1, a block diagram depicts an information handling system 10 and display 24 that presents visual images with illumination effects at the display perimeter. In the example embodiment, information handling system 10 processes information with components disposed on and interfaced by a motherboard 12. A central processing unit (CPU) 14 executes instructions stored in random access memory (RAM) 16 to generate information. For example, CPU 14 executes an operating system and applications stored in persistent memory of a solid state drive (SSD) 18 and retrieved to RAM 16. The operating system and applications create visual images for presentation as output to an end user, such as graphical user interfaces that support end user interactions with CPU 14. A graphics processor unit (GPU) further processes visual information to generate pixel values that define visual images at display 24. For instance, GPU 20 defines pixel values in an array that fits a resolution of display 24, such as HDMI resolutions, and communicates the pixel values to display 24 through a display cable 22, such as a DisplayPort cable. A timing controller 36 integrated in display 24 receives the pixel values and scans the values to pixels of a liquid crystal display (LCD) panel 32 for presentation as visual images. The example embodiment illustrates one example of how visual information generated by an information handling system 10 is translated into visual images, however, any other types of conventional presentation of visual images at a display may be used, as are known in the art.

In the example embodiment, display 24 is built in a display housing 26 that holds a backlight assembly 28 aligned under LCD panel 32. Backlight assembly 28 includes an illumination source and optical elements that seek to provide an even illumination of white light through LCD panel 32. LCD panel 32 includes an array of pixels having liquid crystals interfaced with timing controller 36. Voltages managed by timing controller 36 and applied pixel liquid crystals change the state of the liquid crystals, thus adjusting light filter characteristics of the liquid crystals. A typical pixel includes red, green and blue liquid crystal filters so that a variety of colors may be generated at each pixel. A translucent material 30, such as a colored insulative foam, is disposed between display housing 26 and LCD panel 32 to filter backlight illumination that leaks along the backside perimeter of LCD panel 32 towards the frontside of display 24. Conventional displays include a black foam that prevents leakage of light. By substituting a translucent material with a color filter effect, passive leakage of backlight illumination creates a visual effect at the frontside of display 24 without a need to include a bezel 34. In one alternative embodiment, a bezel 34 covers the perimeter of LCD panel 32 for a visual effect or to help keep out contaminants with a transparent or translucent material, such as a resin. The illumination at the frontside perimeter of LCD panel 32 provides lighting effects that blend the border of LCD panel 32 with content presented by the pixels of LCD panel 32.

In various embodiments, translucent material 30 may provide a passive or active management of perimeter illumination. Passive management of perimeter illumination is accomplished, for instance, by coupling a color insulative foam between display housing 26 and LCD panel 32, such as color that tends to blend with visual images of LCD panel 32 or that provide a desired highlight, such as for gaming. Active management of perimeter illumination is accomplished, for instance, by adjusting the light transmission characteristics of translucent material 30 or bezel 34. As an example, a color manager 40, such as logic executing as embedded code of GPU 20 or an operating system driver on CPU 14, commands alterations in the light transmission characteristics of translucent material 30 and/or bezel 34 to adjust the color and/or brightness of illumination at the perimeter of LCD panel 32. For instance, a color and/or brightness may be selected based upon content provided from information handling system 10 for presentation at display 24, such as by selecting a color for the perimeter that blends with visual images presented by LCD panel 32 at the perimeter. Color manager 40 communicates the desired perimeter lighting effect to a color controller 38, such as through a DisplayPort auxiliary control line, for implementation of the light effect. In one embodiment, color controller 38 may determine a setting on its own for application to translucent material 30, such as by analyzing pixel values provided from GPU 20. For instance, translucent material 30 may have a color selected based upon an average pixel value for pixels at the perimeter of LCD display panel 32. In an example embodiment, bezel 34 may include liquid crystals that have states set by voltages determined by color controller 38, such as to determine brightness and color that proceed through bezel 34. In one alternative embodiment, bezel 34 may enhance lighting effects with a matt finish or a pattern that manipulates light passage.

Figure 2:
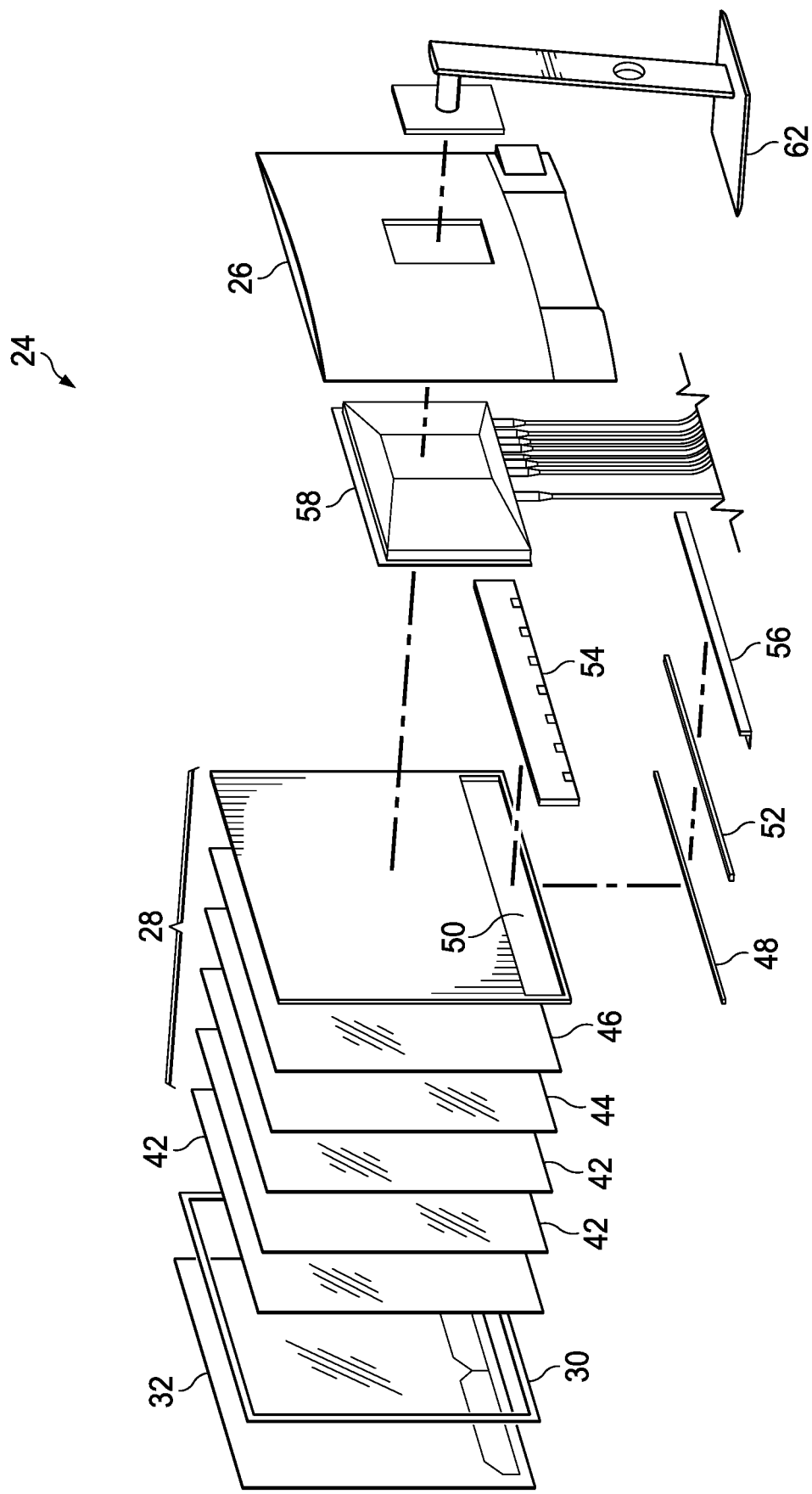
FIG. 2 depicts an exploded view of a display having a translucent material that adapts backlight illumination to provide illumination effects at the display frontside perimeter.

Referring now to FIG. 2, an exploded view depicts a display 24 having a translucent material 30 that adapts backlight assembly 28 illumination to provide illumination effects at the display frontside perimeter. LCD panel 32 is disposed at a frontside of display 24 to filter a white backlight from backlight assembly 28 with liquid crystal pixels, thus defining visual images. Backlight assembly 28 in the example embodiment seeks to provide a uniform backlight illumination with a stack of optical elements, such as optical sheets 42, a light guide panel 44, a reflector 46 and an array of light emitting diodes (LEDs) 48 that generate white light. In the example embodiment, a bottom panel 50, light cover 52 and assembly components 54 and 56 hold backlight assembly 28 as a contiguous piece and assembles over a component chassis 58 and against a rear display housing 26. A stand 62 holds the assembled display components in a vertically raised position.

Translucent material 30 compresses against the backside of LCD panel 32 at the perimeter with a compressive force provided from bottom panel 50 pressed towards LCD panel 32 by display housing 26. As backlight assembly 28 generates illumination to present visual images at LCD panel 32, some amount of illumination leaks outwards towards the perimeter of LCD panel 32 and at translucent material 30. A filter characteristic of translucent material 30 changes the color from white light to a pigment included in translucent material 30 and then directs the light out the front side of display 24.

Figure 3A:
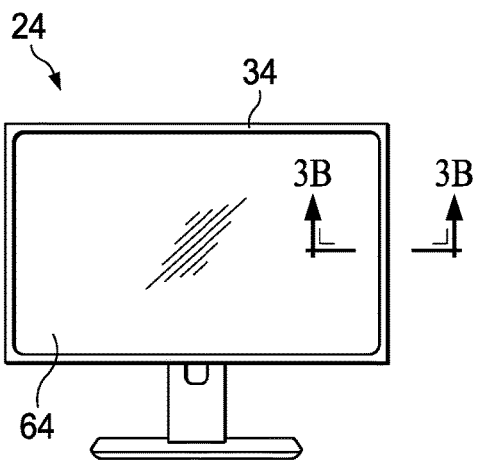
FIGS. 3A, 3B and 3C depict a cutaway view of a display configured to manage illumination of an external perimeter with light generated by an internal backlight.
Figure 3B:
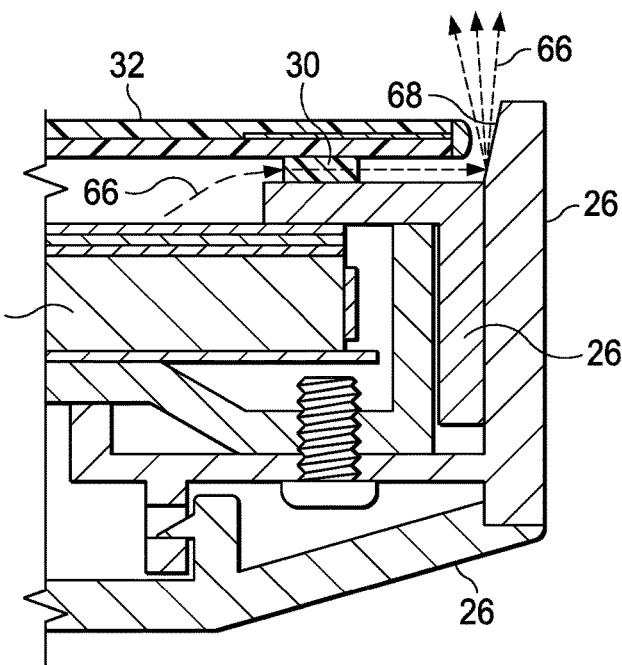
Figure 3C:
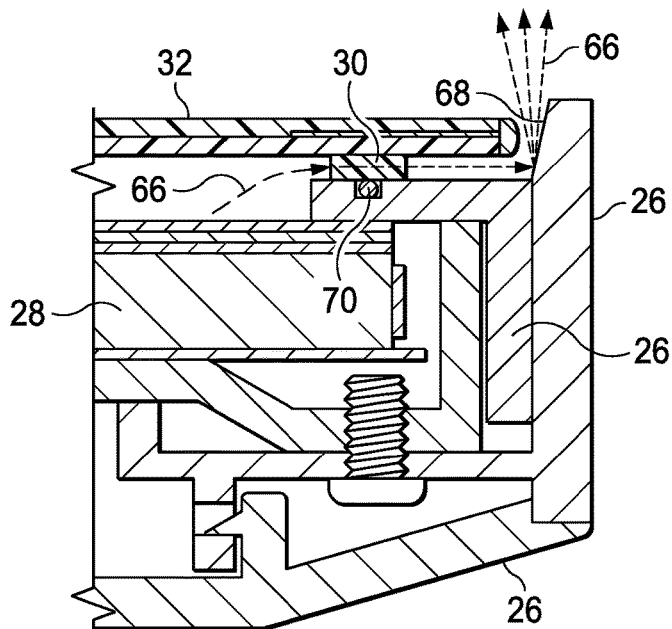

Referring now to FIGS. 3A, 3B and 3C, a cutaway view depicts display 24 configured to manage illumination of an external perimeter with light generated by an internal backlight. FIG. 3A depicts content 64 presented at display 24 with the perimeter around content 64 illuminated with a blending color that highlights content 64. A cross sectional view depicted by FIG. 3B shows an example embodiment for direction of white light illumination by backlight assembly 28 from the interior of display 24 outwards at the perimeter of content presented at LCD panel 32. Light generated at backlight assembly 28 proceeds laterally through translucent material 30 where the light is filtered to a color matching translucent material 30. A reflector 68, such as a beveled reflective surface of display housing 26, redirects light along the path indicated by arrows 66 at a frontside perimeter of LCD display panel 32. In one alternative embodiment, the light may proceed through a bezel that further adapts color and brightness presented at the perimeter of LCD display panel 32. In the example embodiment, translucent material 30 has a consistent color about the entire perimeter of LCD panel 32. In an alternative embodiment, the color may vary about the perimeter to provide a rainbow or other visual effect. In one alternative embodiment, translucent material 30 may include a photochromic pigment or dye that changes light filter characteristics when exposed to particular light frequencies, such as infrared light. For instance, the photochromatic pigment may adjust light filtering characteristics based upon ambient light that arrives within display 24, such as by increasing or decreasing light filtering as detected infrared light changes or enabling different light filter colors as detected infrared light changes.

FIG. 3C provides an example embodiment for active management of backlight leakage characteristics with alteration of light transmission qualities of a pigment included in translucent material 30. In the example embodiment, a thermochromic pigment or dye is integrated in translucent material 30 and selectively heated with an electrode 70 or other heat source to activate color filtering. In various embodiments, colors may be selected with different levels of heat and may include combinations that define intermediate color schemes. For example, three separate foam layers may each have their own color pigment and heating element so that applying different amounts of heat at each foam layer will create a different color effect, such as by combining red, green and blue color pigments. Activation of each color on each foam layer may be driven locally at display 24 or from a graphics controller that defines images for presentation at display 24. For instance, a timing controller of display 24 may selectively activate colors of translucent material 30 based upon averaging of pixel value colors sent by a graphics processor. In one embodiment, brightness is controlled with a dark pigment that, when heated, substantially or completely eliminates passage of illumination from backlight assembly 28 to the perimeter of LCD panel 32.

Although the present invention has been described in detail, it should be understood that various changes, substitutions and alterations can be made hereto without departing from the spirit and scope of the invention as defined by the appended claims.

What is claimed is:

1. An information handling system comprising: a processor operable to execute instructions to process information; a memory interfaced with the processor and operable to store the instructions and information; a graphics processor interfaced with the processor and operable to further process the information to defined visual images for presentation at a display; a display interfaced with the graphics processor and operable to accept the information to present the visual images at a display panel integrated in a display housing, the display panel having plural pixels illuminated with white light by a backlight assembly coupled at a backside of the display panel and within a perimeter of the display panel; and a frame of translucent material disposed between the display panel and backlight assembly at the backside perimeter, a frame of translucent material having a central opening, a frame of translucent material passing illumination from the backlight assembly towards the display housing outside the backside perimeter to provide illumination outside of the perimeter of the display panel.

2. The information handling system of claim 1 further comprising: a beveled surface formed in the housing between a frame of translucent material and a front of the display; wherein the beveled surface reflects illumination proceeding out of a frame of translucent material towards the front of the display at a frontside perimeter of the display panel.

3. The information handling system of claim 2 further comprising: a bezel disposed about the frontside perimeter of the display; wherein the beveled surface reflects illumination from a frame of translucent material to the bezel.

4. The information handling system of claim 1 wherein a frame of translucent material comprises a foam compressed by the display panel against the display housing and having an integrated color.

5. The information handling system of claim 1 further comprising: a color controller interfaced with a frame of translucent and operable to adjust a color filter quality of a frame of translucent material; wherein the color controller adapts the color of backlight that proceeds from the backlight assembly towards the display housing outside the backside perimeter.

6. The information handling system of claim 5 further comprising: a color manager associated with the graphics processor and operable to command a color to the color controller; wherein the graphics processor adapts the color filter quality of a frame of translucent material based upon content presented as visual images at the display panel.

7. The information handling system of claim 5 further comprising:
a timing controller integrated in the display housing and interfaced with the graphics process to scan the visual images as pixel values to the display panel;
wherein the timing controller commands the color controller to adjust the color filter quality to a color selected based upon anlysis of the pixel values.

8. The information handling system of claim 1 wherein a frame of translucent material further comprises a foam integrating a photochromatic pigment.

9. The information handling system of claim 1 wherein a frame of translucent material further comprises a liquid crystal interfaced with a voltage source, the voltage source adapting the voltage to adjust a color of illumination that passes through a frame of translucent material.

10. A method for managing illumination at an information handling system display, the method comprising: generating illumination with a backlight assembly; passing the illumination from the backlight assembly through a backside of a liquid crystal display panel to create a visual image at a frontside of the liquid crystal display panel, the backlight assembly having a perimeter disposed within a perimeter of the liquid crystal display panel; and leaking illumination from the backlight assembly to outside of the perimeter of the liquid crystal display panel through a frame of translucent material disposed at the perimeter of the liquid crystal display panel between the backlight assembly and liquid crystal display panel, a frame of translucent material having a central opening at the location of the liquid crystal display panel, a frame of translucent material adapting the backlight illumination to a color presented outside the perimeter of the liquid crystal display panel.

11. The method of claim 10 wherein: a frame of translucent material comprises a liquid crystal material; and the leaking further comprises applying a voltage to a frame of translucent material to adapt a color of illumination that illuminates from a frame of translucent material.

12. The method of claim 10 wherein: a frame of translucent material comprises a thermochromic pigment; and the leaking further comprises adjusting a temperature of a frame of translucent material to adapt illumination that illuminates from a frame of translucent material.

13. The method of claim 10 wherein: a frame of translucent material comprises a photochromatic pigment; and the leaking further comprises exposing the photochromatic pigment to ambient light to adjust an amount of light that passes through a frame of translucent material.

14. The method of claim 11 further comprising: reflecting illumination proceeding out of a frame of translucent material towards a frontside of the display at the liquid crystal display panel perimeter; and disposing a bezel at the liquid crystal display panel perimeter, the reflected illumination passing through the bezel.

15. The method of claim 10 wherein a frame of translucent material comprises a foam disposed between liquid crystal panel and the backlight.

16. A display comprising: a housing; a backlight coupled to the housing and configured to output illumination, the backlight having a backlight perimeter; a liquid crystal display panel having a display panel perimeter and coupled to the housing over the backlight, the backlight aligned to provide illumination through the liquid crystal display panel, the backlight perimeter disposed within the display panel perimeter; and a frame of translucent material having a perimeter around the liquid crystal display and a central opening at the liquid crystal display, a frame of translucent material disposed between the liquid crystal display and the housing at a backside of the liquid crystal display panel to allow illumination to proceed out from the backlight perimeter to a frontside of the liquid crystal display panel outside of the display panel perimeter to illuminate the housing perimeter outside of the liquid display panel perimeter.

17. The display of claim 16 wherein a frame of translucent material comprises a thermochromic pigment, the display further comprising a heating element disposed at a frame of translucent material to selectively heat the thermochromic pigment.

18. The display of claim 16 wherein a frame of translucent material comprises a photochromic pigment, a frame of translucent material exposed to ambient light that adapts illumination from the backlight that passes through a frame of translucent material.

19. The display of claim 16 further comprising: a reflective material disposed at the housing proximate a frame of translucent material and aligned to direct the backlight illumination towards the frontside perimeter; and a bezel disposed at the frontside perimeter.

20. The display of claim 19 wherein the bezel comprises a liquid crystal material configured to adapt the color of backlight proceeding from the reflective material.

* * * * *